United States Patent
Garcia et al.

(10) Patent No.: US 11,155,037 B2
(45) Date of Patent: Oct. 26, 2021

(54) PRINTER SYSTEM

(71) Applicant: HEWLETT-PACKARD DEVELOPMENT COMPANY, L.P., Houston, TX (US)

(72) Inventors: Pedro Garcia, Sant Cugat del Valles (ES); Juan Manuel Zamorano, Sant Cugat del Valles (ES); Luis Ortega, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 481 days.

(21) Appl. No.: 16/088,616

(22) PCT Filed: Mar. 28, 2017

(86) PCT No.: PCT/US2017/024588
§ 371 (c)(1),
(2) Date: Sep. 26, 2018

(87) PCT Pub. No.: WO2018/182582
PCT Pub. Date: Oct. 4, 2018

(65) Prior Publication Data
US 2021/0008802 A1 Jan. 14, 2021

(51) Int. Cl.
*B29C 64/393* (2017.01)
*B33Y 30/00* (2015.01)
*B33Y 50/02* (2015.01)

(52) U.S. Cl.
CPC ............ *B29C 64/393* (2017.08); *B33Y 30/00* (2014.12); *B33Y 50/02* (2014.12)

(58) Field of Classification Search
CPC ........ B29C 64/393; B33Y 30/00; B33Y 50/02
See application file for complete search history.

(56) References Cited

U.S. PATENT DOCUMENTS 5,977,660 A * 11/1999 Mandalakas .......... H02J 3/1842
307/105
6,018,203 A    1/2000 David et al.
(Continued)

FOREIGN PATENT DOCUMENTS

CA    2355188 A1    6/2000
WO    16048173 A1   3/2016

OTHER PUBLICATIONS

Terorde et al., "New Real-time Heuristics for Electrical Load Rebalancing in Aircraft", IEEE Transactions on Aerospace and Electronic Systems, vol. 52, No. 3, Retrieved from Internet: http://ieeexplore.ieee.org/abstract/document/7511846/, Jun. 2016, pp. 1120-1131.

*Primary Examiner* — Mark A Osele
*Assistant Examiner* — Evan T Hulting
(74) *Attorney, Agent, or Firm* — HP Inc. Patent Department

(57) ABSTRACT

A printer comprising an electrical load, a control system and an electrical circuit to switchably connect the electrical load to a first phase and a second phase of a polyphase power supply. The control system monitors a first electrical current drawn by the printer on the first phase and a second electrical current drawn by the printer on the second phase. When a difference between the first electrical current and the second electrical current satisfies a threshold condition, the control system controls the electrical circuit to disconnect the electrical load from the first phase and connect the electrical load to the second phase.

20 Claims, 4 Drawing Sheets

(56) References Cited

U.S. PATENT DOCUMENTS

| | | | |
|---|---|---|---|
| 8,527,109 B2 * | 9/2013 | Kulyk | G06Q 10/04 700/296 |
| 9,166,410 B1 | 10/2015 | Kim et al. | |
| 2011/0107931 A1 | 5/2011 | Haaf et al. | |
| 2012/0326683 A1 | 12/2012 | Johnson | |
| 2014/0084893 A1 | 3/2014 | Chen | |
| 2014/0114491 A1 | 4/2014 | Jordan, II | |
| 2015/0349529 A1 | 12/2015 | Arya et al. | |
| 2015/0362941 A1 | 12/2015 | Ewing et al. | |
| 2016/0064932 A1 | 3/2016 | Fischer et al. | |

\* cited by examiner

PRINTER SYSTEM

BACKGROUND

Additive manufacturing systems, including those commonly referred to as "3D printers", build three-dimensional (3D) objects from selective addition of build material. In an example system, build material is formed in layers in a working area. Chemical agents, referred to as "printing agents" are selectively deposited (e.g. "printed") onto each layer within the working area. In one case, the printing agents may comprise a fusing agent and a detailing agent. The fusing agent is selectively applied to each layer in areas where particles of the build material are to fuse together, and the detailing agent is selectively applied where the fusing action needs to be reduced or amplified. Energy is applied to the build material in the working area and portions of the build material where the fusing agent has been applied absorb relatively more energy, thereby causing those portions to heat up and fuse. In other example, a chemical binder may be used to chemically bind the build material.

Additive manufacturing systems such as those described above may comprise a wide range of different electrical and electro-mechanical systems. These systems may draw significant electrical current from a power supply to the additive manufacturing system. Moreover, in some cases, the electrical current drawn from the power supply by a particular system may fluctuate as the systems are activated and deactivated in accordance with the additive manufacturing process.

BRIEF DESCRIPTION OF THE DRAWINGS

Various features of the present disclosure will be apparent from the detailed description which follows, taken in conjunction with the accompanying drawings, which together illustrate, by way of example only, features of the present disclosure, and wherein.

DETAILED DESCRIPTION

Figure 1:
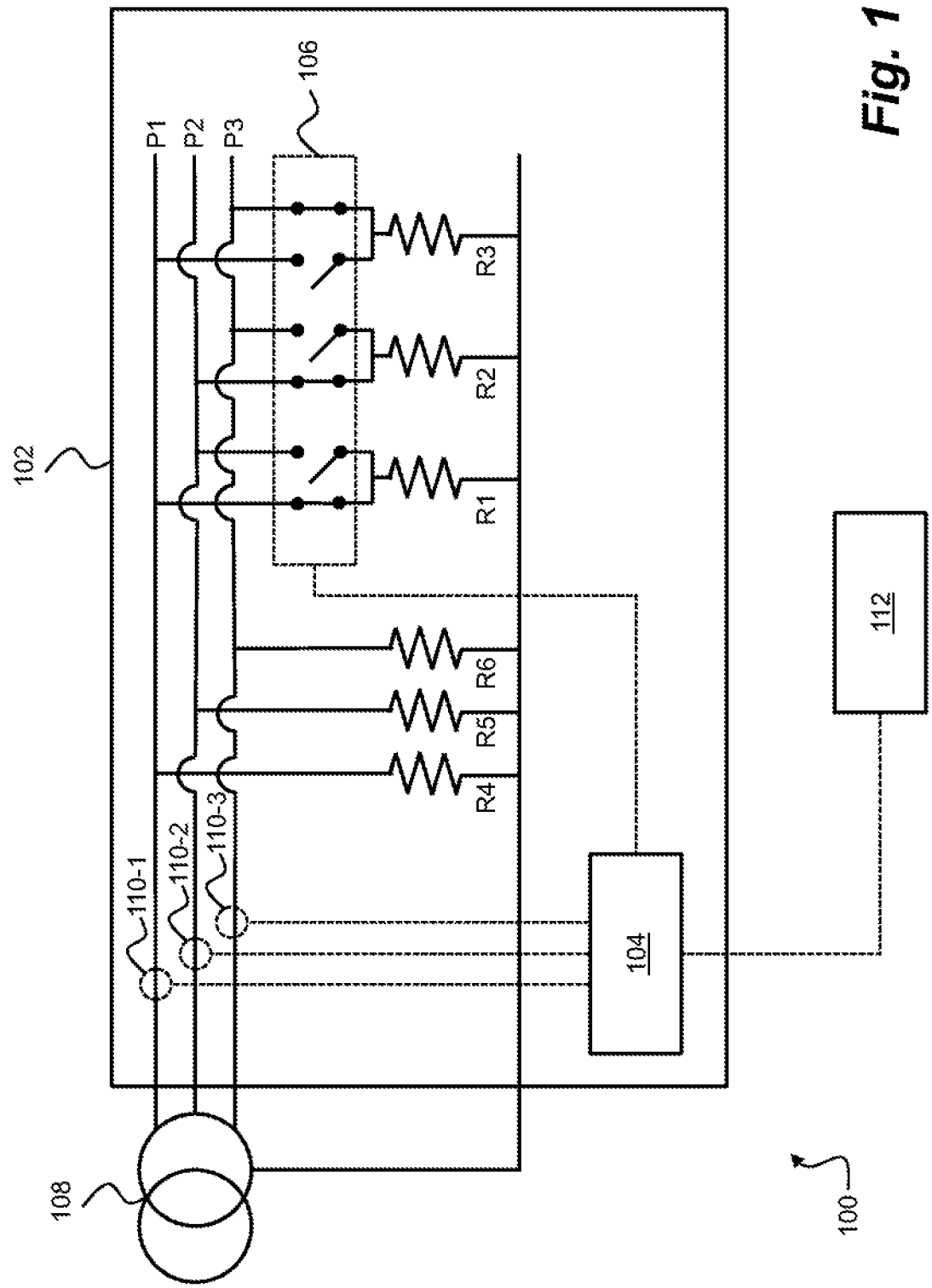
FIG. 1 is a schematic diagram showing a printer system in accordance with an example.

In the following description, for purposes of explanation, numerous specific details of certain examples are set forth. Reference in the description to "an example" or similar language means that a particular feature, structure, or characteristic described in connection with the example is included in at least that one example, but not necessarily in other examples.

A printer employing an additive manufacturing process may include one or more electrical loads, in the form of electrical and/or electro-mechanical components, which draw a relatively high electrical current from a power supply to the printer. For example, such printers may include one or more elements or lamps for fusing a build material during the additive manufacturing process. In such printers, a three-phase power supply may be utilized to ensure that the power requirements of the printer can be met during the manufacturing process. However, activation of the one or more electrical loads during the manufacturing process may be transient, thereby potentially leading to imbalances between the current drawn on each phase of the three-phase power supply. This imbalance may consequently cause premature wearing or "aging" of the three-phase power supply. Moreover, the imbalance between the electrical current drawn on each phase of the three-phase power supply may unduly limit the number of printers which are able to use the three-phase power supply simultaneously without exceeding its nominal capacity on a given phase.

Certain examples described herein provide printer-level power management by switching an electrical load in the printer from a first phase to a second phase of a polyphase power supply. In this manner, the printer is able to balance the electrical current drawn on the first and second phases of the polyphase power supply. This printer-level power management ensures efficient use of the polyphase power supply and reduces premature wear of the polyphase power supply due to imbalance between the electrical current fed on each of its plurality of phases.

According to some examples, the printer may comprise an electrical circuit to switchably connect the electrical load to the first phase and the second phase of the polyphase power supply, and a control system to monitor a first electrical current drawn by the printer on the first phase and a second electrical current drawn by the printer on the second phase. The control system may control the electrical circuit to disconnect the electrical load from the first phase and connect the electrical load to the second phase when a difference between the first electrical current and the second electrical current satisfies a threshold condition. In this respect, the threshold condition may indicate a maximum permitted difference between the first electrical current and the second electrical current. For example, the threshold condition may express the maximum permitted difference between the first electrical current and the second electrical current as an absolute value (i.e. an absolute value of electrical current) or a relative value (i.e. a percentage value). Similarly, the threshold condition may by varied by an operator of the printer, or may vary in accordance with the one or more transient parameters, such as total current drawn by the printer from the polyphase power supply.

According to some examples, the control system may include a plurality of electrical current sensors to monitor the first electrical current drawn by the printer on the first phase and the second electrical current drawn by the printer on the second phase. For example, the control system may comprise a plurality of digital ammeters to monitor the electrical current drawn by the printer on each phase of the polyphase power supply.

According to some examples, the printer may switch the electrical load from the first phase to the second phase of the polyphase power under the control of an external power management system. In this respect, the control system of the printer may comprise an interface to receive control data from the power management system and the control system may control the electrical circuit to disconnect the electrical load from the first phase and connect the electrical load to the second phase based on the control data.

In some examples, the control system may send status data to the power management system. The status data may, for example, indicate whether the electrical load is connected to the first phase or the second phase, and/or the first electrical current drawn by the printer on the first phase and the second electrical current drawn by the printer on the second phase.

In some examples, the polyphase power supply may be a three-phase power supply comprising a first phase, a second phase and a third phase. The three-phase power supply may be a "3-wire" supply (i.e. no neutral line) or a "4-wire" supply (i.e. with a neutral line).

FIG. 1 shows a system 100 comprising a printer 102 according to an example. The printer 102 comprises a plurality of electrical loads R1 to R6 which draw power from a three-phase power supply 108. In this respect, electrical loads R1 to R3 are connected to the three-phase power supply 108 via circuitry 106 which switchably connects each of the loads R1 to R3 to two or more phases of the three-phase power supply 108. Specifically, the circuitry 106 switchably connects the first electrical load R1 to the first phase P1 or the second phase P2 of the three-phase power supply 108; switchably connects the second electrical load R2 to the second phase P2 or the third phase P3 of the three-phase power supply 108; and switchably connects the third electrical load R3 to the first phase P1 or the third phase P3 of the three-phase-power supply 108. In contrast, electrical load R4 is connected directly to the first phase P1 of the three-phase power supply 108; electrical load R5 is connected directly to the second phase P2 of the three-phase power supply 108; and electrical load R6 is connected directly to the third phase P3 of the three-phase power supply 108.

The circuitry 106 is controlled by a controller 104, which monitors the electrical current drawn by the printer 102. In this respect, the controller 104 may receive signals or data indicative of the current drawn by the printer 102 on each phase of the three-phase power supply 108 from a plurality of electric current sensors 110-1, 110-2 and 110-3 corresponding respectively to the first phase P1, the second phase P2 and the third phase P3 of the three-phase power supply 108. Based on the signals or data received from the plurality of electric current sensors 110-1, 110-2 and 110-3, the controller 104 determines when the difference between the electrical current drawn by the printer 102 on any two phases of the three-phase power supply satisfies a threshold condition. In other words, the controller 104 determines when the difference between the electrical current drawn on two phases of the three-phase power supply exceeds a maximum permitted difference. When the threshold condition is satisfied, the controller 104 controls the circuitry 106 to switch an electrical load in the plurality of electrical loads R1, R2 and R3 from one phase to another phase of the three-phase power supply 108 to alleviate the detected imbalance.

For example, when the controller 104 determines that the electrical current drawn by the printer on the first phase P1 exceeds the electrical current drawn by the printer on the second phase P2 by more than the maximum permitted difference the controller 104 may control the circuitry 106 to switch the first load R1 from the first phase P1 to the second phase P2. Similarly, when the controller 104 determines that the electrical current drawn by the printer on the second phase P2 exceeds the electrical current drawn by the printer on the third phase P3 by more than the maximum permitted difference, the controller 104 may control the circuitry 106 to switch the second load R2 from the second phase P2 to the third phase P3. Further, when the controller 104 determines that the electrical current drawn by the printer on the third phase P3 exceeds the electrical current drawn by the printer on the first phase P1 by more than the maximum permitted difference, the controller 104 may control the circuitry 106 to switch the third load R3 from the third phase P3 to the first phase P1.

In some examples, the controller 104 may cause the circuitry 106 to switch an electrical load from one phase to another phase at a time when the electrical load is not drawing current from the three-phase power supply 108. In this manner, the controller ensures that the switching process does not affect the additive manufacturing process. This "active" switching may be achieved by monitoring the electrical current drawn by each of the electrical loads R1, R2 and R3 or by monitoring the additive manufacturing process itself to determine when each of the electrical loads R1, R2 and R3 is active or inactive. In some examples, the controller 104 may pause the additive manufacturing process during the switching process.

In some examples, the controller 104 may maintain status data (not shown) indicating the status of each of the electrical loads R1, R2 and R3. The status data may indicate, for each of the electrical loads R1, R2 and R3, the available phases for connection and the currently connected phase. The status data may also indicate one of more characteristics of each of the electrical loads R1, R2 and R3, such as electrical resistance and/or impedance. The status data may also indicate a switching priority for each of the plurality of electrical loads, thereby enabling an operator to specify one or more electrical nodes to be preferentially switched in response to detecting an imbalance on the three-phase power supply 108. The controller 104 may use the status data to determine which of the electrical loads to switch in response to detecting an imbalance between the electrical currents being drawn on two of the phases on the three-phase power supply 108. For example, when the controller 104 has a choice of a plurality of electrical loads to switch from a first phase to a second phase in response to detecting an imbalance between the first phase and the second phase, the controller 104 may select the load to switch based on one of more characteristics indicated in the status data.

In some examples, the printer 102 may comprise an interface (not shown) to facilitate communications between the controller 104 and a power management system 112. The power management system 112 may select which of the electrical loads R1, R2 and R3 to switch from one phase to another phase in response to an imbalance detected by the controller 104. For this purpose, the controller 104 may transmit the status data to the power management system 112. Further, the controller 104 may transmit a notification to the power management system 112 in response to detecting an imbalance between the electrical current drawn by the printer 102 on the three-phase power supply 108. In response to receipt of such a notification, the power management system 112 may select an electrical load from electrical loads R1, R2 and R3 to switch phase, based on the received status data.

Figure 2:
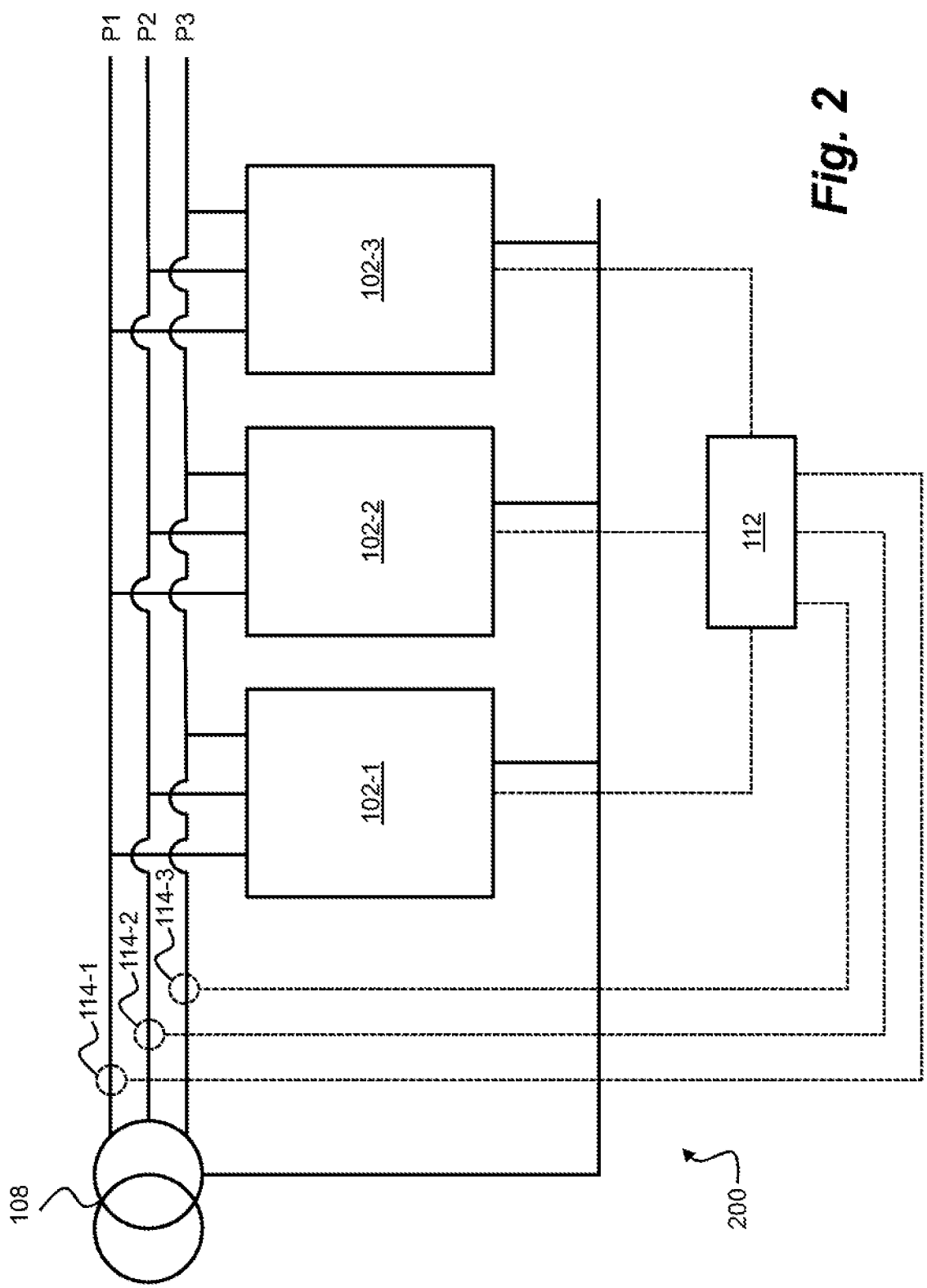
FIG. 2 is a schematic diagram showing a printer system in accordance with a further example.

In some examples, the power management system 112 may provide power management of a plurality of printers 102-N (where N is an integer) connected to the three-phase power supply 108, as shown in FIG. 2. In this example, each of the plurality of printers 102-N corresponds to the printer 102 described above with reference to FIG. 1 and each of the plurality of printers 102-N is connected to the three-phase power supply 108. Each of the plurality of printers 102-N communicates with the power management system 112 to transmit status data and notifications of an imbalance between the electrical current drawn by the printer on each phase of the three-phase power supply, as discussed above with reference to FIG. 1.

The power management system 112 may also monitor the electrical current drawn by the plurality of printers 102-N as a whole on each phase of the three-phase power supply 108, via a plurality of electric current sensors 114-1, 114-2 and 114-2 corresponding respectively to the first phase P1, second phase P2 and third phase P3 of the three-phase power supply 108. In this manner, the power management system 112 may detect an imbalance in the electrical current drawn on each phase of the three-phase power supply 108 by the plurality of printers 102-N as a whole. In response to detecting such an imbalance, the power management system 112 may select one or more loads in the plurality of loads associated with the plurality of printers 102-N, based on the status data received from each printer, and instruct the printer comprising the selected load to switch phase to alleviate the imbalance. Thus, the power management system 112 may act to alleviate imbalances across the plurality of printers 102-N as a whole, in addition to the printer-level control provided by the controller 104 in each of the plurality of printers 102-N.

In some examples, the power management system 112 may take the form of a server which is connected to each printer over a network, such as a local area network or a wireless network. In other examples, the power management system 112 may be a component of the controller 104 in the plurality of printers 102-N. In this respect, one of the printers in the plurality of printers 102-N may be configured as a "master" for the purposes of power management and thus function as the power management system 112 for other printers in the plurality of printers 102-N which in turn function as "slaves" for the purposes of power management.

Figure 3:
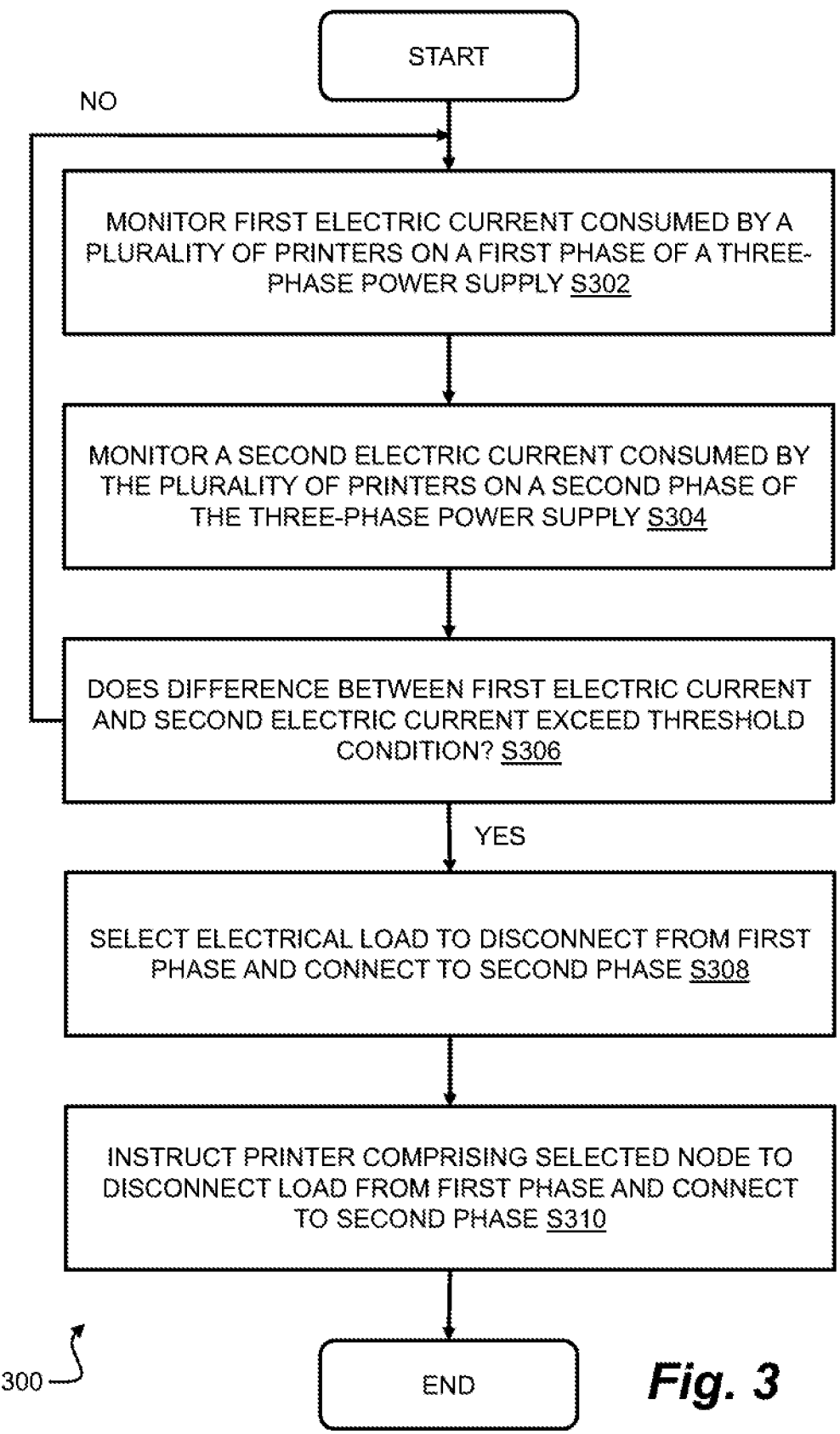
FIG. 3 is a flow chart showing a method in accordance with an example.

FIG. 3 shows an example of a method 300 of managing a plurality of printers, such as the plurality of printers 102-N described above with reference to FIG. 2. In some examples, the method 300 may be performed by the power management system 112 described above with reference to FIG. 2. The method 300 comprises monitoring a first electrical current drawn by the plurality of printers 102-N on a first phase of the three-phase power supply 108 (block S302) and monitoring a second electrical current drawn by the plurality of printers 102-N on a second phase of the three-phase power supply 108 (block S304). Next, the method determines whether a difference between the first electrical current and the second electrical current exceeds a threshold condition (block S306). If the difference does not exceed the threshold condition, the method proceeds to monitor the first electric current on the first phase and the second electric current on the second phase (blocks S302 and S306). If the difference does exceed the threshold condition, the method proceeds to select an electrical load associated with the plurality of printers 102-N to disconnect from the first phase and connect to the second phase (block S308) and to instruct or cause a printer in the plurality of printers 102-N which comprises the selected load to disconnect the selected electrical load from the first phase and connect the electrical load to the second phase (block S310).

According to some examples, the method may further comprise receiving status data from the plurality of printers and selecting the electrical load to be switched based on the status data, wherein the printer comprises the electrical load. The status data may, for example, indicate a phase of the three-phase power supply 108 to which each electrical load in a plurality of electrical loads comprised by the plurality of printers is connected. The status data may also indicate, for each printer in the plurality of printers, an electrical current drawn by the respective printer on each phase of the three-phase power supply 108.

Figure 4:
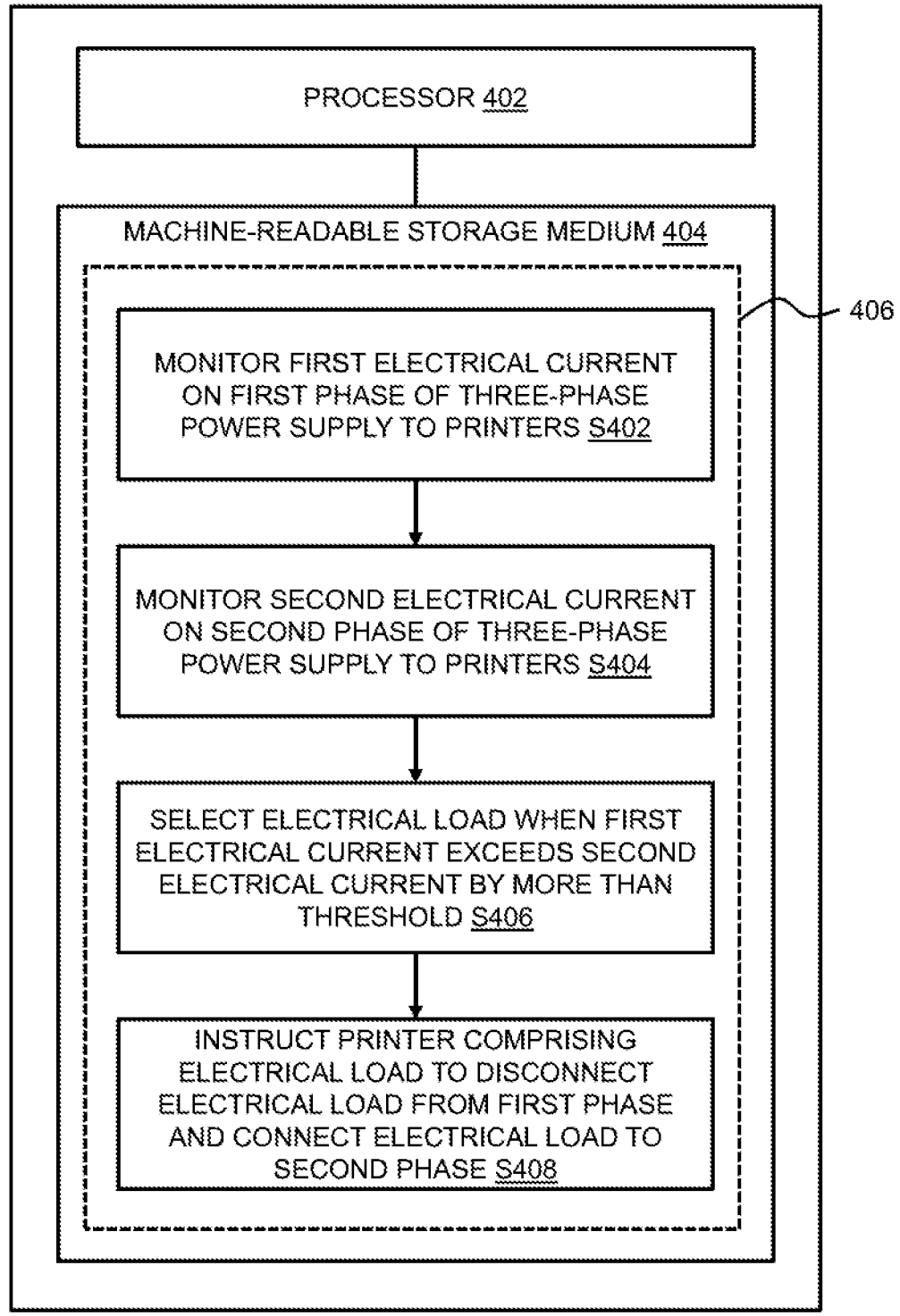
FIG. 4 is a schematic diagram showing a power management system in accordance with an example.

FIG. 4 shows an example of a power management system 400, including a processor 402 and a machine-readable storage medium 404. The machine-readable storage medium includes instructions 406 which, when executed by the processor 402, cause the power management system 400 to perform a method according to examples described herein.

For example, the instructions 406 may cause the power management system 400 to perform a method of managing the plurality of printers 102-N described above with reference to FIG. 2. In this respect, the processor 402 may form part of the power management system 112 described above with reference to FIGS. 1 and 2. The instructions 406 may be retrieved from a machine-readable media (e.g. any media that can contain, store, or maintain programs and data for use by or in connection with an instruction execution system). In this case, the machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

In some examples, the machine-readable storage medium 404 may include instructions 406 which cause the power management system 400 to monitor a first electrical current on a first phase of the three-phase power supply 108 feeding the plurality of printers 102-N (block S402) and monitor a second electrical current on a second phase of the three-phase power supply 108 feeding the plurality of printers 102-N (block S404). The instructions may further cause the power management system 400 to select, from a plurality of loads associated with the plurality of printers 102-N, an electrical load connected to the first phase and disconnected from the second phase when the first electrical current exceeds the second electrical current exceeds by more than a maximum permitted difference (block S406) and instruct a printer in the plurality of printers 102-N which comprises the selected electrical load to disconnect the electrical load from the first phase and connect the electrical load to the second phase (block S408).

According to some examples, the instructions stored on the machine readable storage medium 404 may also cause the power management system 400 to receive, from the plurality of printers 102-N, status data indicating, for each electrical load in the plurality of electrical loads 102-N, a phase of the three-phase power supply 108 to which the respective electrical load is connected. In this manner, the electrical load to be disconnected from the first phase and connected to the second phase may be selected on the basis of the received status data. For example, the status data may indicate, for each printer in the plurality of printers, an electrical current drawn by the respective printer on each phase of the three-phase power supply 108, thereby enabling the power management system 400 to identify a suitable electrical load to disconnect from the first phase and connect to the second phase of the three-phase power supply 108.

In the examples described above with reference to FIGS. 1 to 4, the controller 104 and/or the power management system 112 may be implemented by one or more instructions executed by a processor. The processor may be a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The processor may also be implemented as a combination of computing devices, e.g., a combination of a DSP and a microprocessor, a plurality of microprocessors, one or more microprocessors in conjunction with a DSP core, or any other such configuration.

The preceding description has been presented to illustrate examples of the principles described herein. For example, the systems and methods described above with reference to FIGS. 1 to 4 are also applicable to printers supplied to polyphase power supplies (i.e. power supplies comprising two, three, four of more phases). This description is not intended to be exhaustive or to limit these principles to any precise form disclosed and many modifications and variations are possible in light of the above teaching.

What is claimed is:

1. A printer comprising:
an electrical load;
an electrical circuit to switchably connect the electrical load to a first phase and a second phase of a polyphase power supply; and
a control system to:
monitor a first electrical current drawn by the printer on the first phase and a second electrical current drawn by the printer on the second phase; and
control the electrical circuit to disconnect the electrical load from the first phase and connect the electrical load to the second phase when a difference between the first electrical current and the second electrical current satisfies a threshold condition,
wherein the control system is to control the electrical circuit to disconnect the electrical load from the first phase and connect the electrical load to the second phase at a time when the electrical load is not drawing current from the polyphase power supply.

2. The printer of claim 1, wherein:
the control system comprises an interface to receive control data from a power management system; and
the control system controls the electrical circuit to disconnect the electrical load from the first phase and connect the electrical load to the second phase based on the control data received via the interface.

3. The printer of claim 2, wherein the control system sends status data to the power management system, the status data indicating whether the electrical load is connected to the first phase or the second phase.

4. The printer of claim 2, wherein the control system sends status data to the power management system, the status data indicating the first electrical current drawn by the printer on the first phase and the second electrical current drawn by the printer on the second phase.

5. The printer of claim 1, wherein the controller system comprises a plurality of electrical current sensors to monitor the first electrical current drawn by the printer on the first phase and the second electrical current drawn by the printer on the second phase.

6. The printer of claim 1, wherein the threshold condition indicates a maximum permitted difference between the first electrical current and the second electrical current.

7. The printer of claim 1, comprising an additive manufacturing system.

8. A method comprising:
monitoring a first electrical current drawn by a plurality of printers on a first phase of a polyphase power supply;
monitoring a second electrical current drawn by the plurality of printers on a second phase of the polyphase power supply; and
causing a printer in the plurality of printers to disconnect an electrical load from the first phase and connect the electrical load to the second phase when a difference between the first electrical current and the second electrical current exceeds a threshold condition,
wherein the printer is caused to disconnect the electrical load from the first phase and connect the electrical load to the second phase at a time when the electrical load is not drawing current from the polyphase power supply.

9. The method of claim 8, comprising:
receiving status data from the plurality of printers; and
selecting the electrical load based on the status data;
wherein the printer comprises the electrical load.

10. The method of claim 9, wherein the status data indicates a phase of the polyphase power supply to which each electrical load in a plurality of electrical loads comprised in the plurality of printers is connected.

11. The method of claim 9, wherein the status data indicates, for each printer in the plurality of printers, an electrical current drawn by the respective printer on each phase of the polyphase power supply.

12. The method of claim 8, wherein the threshold condition indicates a maximum permitted difference between the first electrical current and the second electrical current.

13. A non-transitory machine-readable medium comprising computer-executable instructions which, when executed by a processor, cause the computer to:
monitor a first electrical current on a first phase of a polyphase power supply feeding a plurality of printers;
monitor a second electrical current on a second phase of the polyphase power supply feeding the plurality of printers;
select, from a plurality of loads associated with the plurality of printers, an electrical load connected to the first phase and disconnected from the second phase when the first electrical current exceeds the second electrical current exceeds by more than a threshold; and
cause a printer in the plurality of printers which comprises the electrical load to disconnect the electrical load from the first phase and connect the electrical load to the second phase,
wherein the printer in the plurality of printers which comprises the electrical load is caused to disconnect the electrical load from the first phase and connect the electrical load to the second phase at a time when the electrical load is not drawing current from the polyphase power supply.

14. The non-transitory machine-readable medium of claim 13, wherein the computer-executable instructions, when executed by the computer, cause the computer to:
receive, from the plurality of printers, status data indicating, for each electrical load in the plurality of electrical loads, a phase of the polyphase power supply to which the respective electrical load is connected;
wherein the electrical load to disconnect from the first phase and connect to the second phase is selected based on the received status data.

15. The non-transitory machine-readable medium of claim 14, wherein the status data indicates, for each printer in the plurality of printers, an electrical current drawn by the respective printer on each phase of the polyphase power supply.

16. The printer of claim 1, wherein the printer comprises a 3D printer.

17. The printer of claim 1, wherein an additive manufacturing process of the printer is paused during the disconnection of the electrical load from the first phase and the connection of the electrical load to the second phase.

18. The method of claim 8, wherein each of the plurality of printers comprises a 3D printer.

19. The method of claim 8, wherein an additive manufacturing process of the printer is paused during the disconnection of the electrical load from the first phase and the connection of the electrical load to the second phase.

20. The non-transitory machine-readable medium of claim 13, wherein each of the plurality of printers comprises a 3D printer.

\* \* \* \* \*